United States Patent
Morita

(10) Patent No.: US 11,128,779 B2
(45) Date of Patent: *Sep. 21, 2021

(54) DATA COMMUNICATION APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hiroyasu Morita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,425

(22) Filed: Feb. 21, 2020

(65) Prior Publication Data

US 2020/0195812 A1 Jun. 18, 2020

Related U.S. Application Data

(63) Continuation of application No. 16/115,680, filed on Aug. 29, 2018, now Pat. No. 10,609,253, which is a
(Continued)

(30) Foreign Application Priority Data

Nov. 22, 2011 (JP) ................................ 2011-255056

(51) Int. Cl.
*H04N 1/44* (2006.01)
*G06F 21/60* (2013.01)
(Continued)

(52) U.S. Cl.
CPC ........... *H04N 1/4406* (2013.01); *G06F 21/31* (2013.01); *G06F 21/606* (2013.01);
(Continued)

(58) Field of Classification Search
CPC ........ G06F 21/606; G06F 21/46; G06F 21/30; G06F 21/51; G06F 21/31; G07C 9/00142; H04N 1/4406
See application file for complete search history.

(56) References Cited

U.S. PATENT DOCUMENTS 5,987,476 A 11/1999 Imai
6,208,436 B1 3/2001 Cunningham
(Continued)

FOREIGN PATENT DOCUMENTS

CN 101282396 A 10/2008
CN 101593282 A 12/2009
(Continued)

OTHER PUBLICATIONS

Office Action issued in Russian Appln. No. 2012149621 dated Oct. 31, 2014.
(Continued)

*Primary Examiner* — Paul E Callahan
(74) *Attorney, Agent, or Firm* — Rossi, Kimms & McDowell LLP

(57) ABSTRACT

A data communication apparatus that is capable of improving operability when inputting authentication information. An authentication unit accepts authentication information inputted when a user logs in to the data communication apparatus and authenticates the user based on the accepted authentication information. A designation unit designates a file transmission destination that is inputted by the authenticated user. A transmission unit transmits a file to the transmission destination inputted. A registration unit registers the transmission destination of the file. A control unit prohibits registration of the authentication information at the time of registration of the transmission destination of the file when the accepted authentication information is used for file transmission, and permits registration of the authentication
(Continued)

information at the time of registration of the transmission destination of the file when the inputted authentication information is not used for file transmission.

33 Claims, 10 Drawing Sheets

Related U.S. Application Data continuation of application No. 14/796,124, filed on Jul. 10, 2015, now Pat. No. 10,110,779, which is a continuation of application No. 13/682,851, filed on Nov. 21, 2012, now Pat. No. 9,131,185.

(51) Int. Cl.
*H04L 29/06* (2006.01)
*G06F 21/31* (2013.01)
*G06F 21/46* (2013.01)
*G06F 21/30* (2013.01)

(52) U.S. Cl.
CPC ............ *H04L 63/083* (2013.01); *G06F 21/30* (2013.01); *G06F 21/46* (2013.01)

(56) References Cited

U.S. PATENT DOCUMENTS

| | | | |
|---|---|---|---|
| 7,353,536 B1 | 4/2008 | Morris | |
| 7,400,421 B2 | 7/2008 | Endo | |
| 7,979,658 B2 | 7/2011 | Obereiner | |
| 8,130,390 B2 | 3/2012 | Honma | |
| 8,171,526 B2 | 5/2012 | Takeuchi | |
| 8,345,285 B2 | 1/2013 | Sugimoto | |
| 8,484,330 B2 | 7/2013 | Kusakabe | |
| 8,555,399 B2 | 10/2013 | Kasahara | |
| 8,994,977 B2 | 3/2015 | Kasuya | |
| 9,304,715 B2 | 4/2016 | Kasahara | |
| 10,110,779 B2 * | 10/2018 | Morita | G06F 21/31 |
| 2005/0188226 A1 | 8/2005 | Kasatani | |
| 2007/0282951 A1 | 12/2007 | Selimis | |
| 2009/0070855 A1 | 3/2009 | Hori | |
| 2009/0201557 A1 | 8/2009 | Honma | |
| 2009/0222896 A1 | 9/2009 | Ichikawa | |
| 2011/0265144 A1 | 10/2011 | Ikeda | |
| 2012/0117131 A1 | 5/2012 | Maruyama | |
| 2014/0012616 A1 | 1/2014 | Moshenek | |

FOREIGN PATENT DOCUMENTS

| | | |
|---|---|---|
| CN | 101827185 A | 9/2010 |
| CN | 102238008 A | 11/2011 |
| CN | 102238172 A | 11/2011 |
| EP | 2037385 A1 | 3/2009 |
| EP | 2381387 A2 | 10/2011 |
| JP | 2001167051 A | 6/2001 |
| JP | 2003037686 A | 2/2003 |
| JP | 2004102417 A | 4/2004 |
| JP | 2004110474 A | 4/2004 |
| JP | 2005242521 A | 9/2005 |
| JP | 2006134301 A | 5/2006 |
| JP | 2007133886 A | 5/2007 |
| JP | 2008257581 A | 10/2008 |
| JP | 2008258892 A | 10/2008 |
| JP | 2009188628 A | 8/2009 |
| JP | 2010147633 A | 7/2010 |
| JP | 2010250428 A | 11/2010 |
| JP | 2011118515 A | 6/2011 |
| JP | 2011182242 A | 9/2011 |
| JP | 2011232884 A | 11/2011 |
| JP | 2011234126 A | 11/2011 |

OTHER PUBLICATIONS

Office Action issued in U.S. Appl. No. 13/682,851 dated Jul. 18, 2014.
Notice of Allowance issued in U.S. Appl. No. 13/682,851 dated Apr. 6, 2015.
Office Action issued in Chinese Appln. No. 201210475748.8 dated Jun. 18, 2015. English translation provided.
Office Action issued in Japanese Appln. No. 2011255056 dated Sep. 8, 2015.
Office Action issued in Japanese Appln. No. 2011255056 dated May 10, 2016.
Extended European Search Report issued in European Appln. No. 12193404.6 dated Dec. 20, 2016.
Office Action issued in Japanese Appln No. 2016157721 dated Jun. 27, 2017.
Office Action issued in Chinese Appln. No. 201710083792.7 dated Jul. 16, 2018. English translation provided.
Office Action issued in U.S. Appl. No. 14/796,124 dated Dec. 19, 2016.
Office Action issued in U.S. Appl. No. 14/796,124 dated Jul. 31, 2017.
Office Action issued in U.S. Appl. No. 14/796,124 dated Dec. 14, 2017.
Notice of Allowance issued in U.S. Appl. No. 14/796,124 dated Jun. 8, 2018.
Office Action issued in Japanese Appln. No. 2017-198659 dated Oct. 16, 2018.
Office Action issued in U.S. Appl. No. 16/115,680 dated Feb. 8, 2019.
Office Action issued in U.S. Appl. No. 16/115,680 dated Aug. 12, 2019.
Notice of Allowance issued in U.S. Appl. No. 16/115,680 dated Nov. 29, 2019.

* cited by examiner

```
---DESTINATION INFORMATION---
PROTOCOL: FILE
DESTINATION TYPE: NEW DESTINATION
HOST NAME: SERVER1
FOLDER NAME: User1Folder
USER NAME: User1
PASSWORD: -----
PASSWORD DELETION: ON ---READING SETTING INFORMATION---
SIZE: AUTO
RESOLUTION: 300 × 300 dpi
     :

---FILE FORMAT INFORMATION---
HIGH COMPRESSION PDF & OCR

---ADDITIONAL INFORMATION---
TRANSMISSION FILE NAME: NONE
```

— 811
— 812
— 813
— 814

DATA COMMUNICATION APPARATUS, CONTROL METHOD THEREFOR, AND STORAGE MEDIUM STORING CONTROL PROGRAM THEREFOR

BACKGROUND OF THE INVENTION

Field of the Invention

The present invention relates to a data communication apparatus, a control method therefor, and a storage medium storing control program therefor.

Description of the Related Art

In recent years, multifunction printers (also known as multifunctional peripheral devices) that have a plurality of functions, such as a facsimile function, a network scan function, and a print function, in addition to a copy function, are used increasingly and widely. Usually, such a multifunction printer is provided with an operation panel having a touch screen function and an operation unit having hard keys. A user calls a desired function from a function list, and operates the apparatus.

User authentication may be required for retaining security and charging for services (and consumable goods) when a user uses the apparatus. In this case, the device performs a user authentication based on input information from a touch panel or a card, and the apparatus becomes available when the authentication is successful.

When a user uses a network scan function of which the destination apparatus is a file server, the user designates an IP address or a host name of the file server, a destination folder, a user name and a password of the login user, as transmission destination information.

The user sets 300*300 dpi as a reading resolution, A4 as a reading size, and PDF as a file format, for example, as setting items for reading. A color mode for reading an original, a transmitting document name, etc. may be set.

The multifunction printer reads an original according to the settings and transmits the read image to the designated destination using the designated communication method.

Since there are many setting items that can be designated at the time of transmission, it is useful that setting operations by a user are simplified.

When a file is transmitted to the file server, the authentication information for logging in to the file server tends to relate to the user who is operating the apparatus. Accordingly, there is a known technique for using the authentication information that was used when a user uses an apparatus as the authentication information for logging in to the file server without making a user input it again.

The transmitting processes that a user (or a plurality of users) performs most often are finite, and there is a known technique that saves transmission destinations, settings for reading, etc., which were once inputted, as settings that are frequently used. The user can call a setting when depressing a predetermined button to which the saved content is assigned, and this makes a user's transmission-setting operation easy.

If the user wants to save the transmission setting to the file server, the user can save the transmission setting as a usual setting to the apparatus by operating a menu displayed on the operation panel after the transmission setting is completed (for example as a "favorite" setting).

However, the settings saved in the apparatus are not always valid when the settings will be called. For example, when the password expiration date is set, the password to the file server may be invalid when the settings will be called. In such a case, if the user calls and transmits the setting saved in the apparatus, a transmission error will arise.

Thus, an authentication information setting apparatus that can access a server using authentication information including an ID and a password, and that can redefine the authentication information when the expiration date of the authentication information saved in the apparatus expires is proposed (for example, see Japanese Laid-Open Patent Publication (Kokai) No. 2001-167051 (JP 2001-167051A)).

However, there is not only a type of authentication information like a password that becomes invalid on the expiration date, but also another type that is valid only when a user is logged in an apparatus. It is not only meaningless to save such authentication information to an apparatus, but also it is not preferred from the point of view of security.

On the other hand, it is preferable that a user is not required to perform a setting operation again when a usual setting saved in an apparatus is called, in order to simplify a user's setting operation. For example, it is not preferable from a view point of operability that a user is required to input authentication information that is not saved as a usual setting whenever the setting is called.

SUMMARY OF THE INVENTION

The present invention provides a data communication apparatus, a control method therefor, and a storage medium storing a control program therefor, which may be capable of improving operability when inputting authentication information used to transmit data to another apparatus.

Accordingly, a first aspect of the present invention provides a data communication apparatus comprising an authentication unit configured to accept authentication information that is inputted when a user logs in to the data communication apparatus and to authenticate the user based on the accepted authentication information, a designation unit configured to designate a transmission destination of a file that is inputted by the authenticated user, a transmission unit configured to transmit a file to the transmission destination inputted by the user, a registration unit configured to register the transmission destination of the file, a control unit configured to prohibit registration of the authentication information at the time of registration of the transmission destination of the file when the authentication information that is inputted when the user logs in to the data communication apparatus is used as authentication information required at the time of file transmission, and to permit registration of the authentication information at the time of registration of the transmission destination of the file when the inputted authentication information is not used as authentication information required at the time of file transmission.

Accordingly, a second aspect of the present invention provides a control method for a data communication apparatus, comprising an authentication step of accepting authentication information that is inputted when a user logs in to the data communication apparatus and of authenticating the user based on the accepted authentication information, a designation step of designating a transmission destination of a file that is inputted by the authenticated user, a transmission step of transmitting a file to the transmission destination inputted by the user, a registration step of registering the transmission destination of the file, a prohibition step of prohibiting registration of the authentication information at the time of registration of the transmission destination of the file when the authentication information that is inputted when the user logs in to the data communication apparatus is used as authentication information required at the time of file transmission, and a permission step of permitting registration of the authentication information at the time of registration of the transmission destination of the file when the inputted authentication information is not used as authentication information required at the time of file transmission.

Accordingly, a third aspect of the present invention provides a non-transitory computer-readable storage medium storing a control program causing a computer to execute the control method of the second aspect.

According to the present invention, the data communication apparatus, the control method therefor, and the storage medium storing a control program therefor which are capable of improving operability when inputting authentication information used to transmit data to another apparatus can be provided.

Further features of the present invention will become apparent from the following description of exemplary embodiments with reference to the attached drawings.

DESCRIPTION OF THE EMBODIMENTS

Hereafter, embodiments according to the present invention will be described in detail, purely by way of example, and with reference to the drawings.

It should be noted that the terms "data communication apparatus" and "image processing apparatus" are interchangeably used in the following description and claims.

Figure 1:
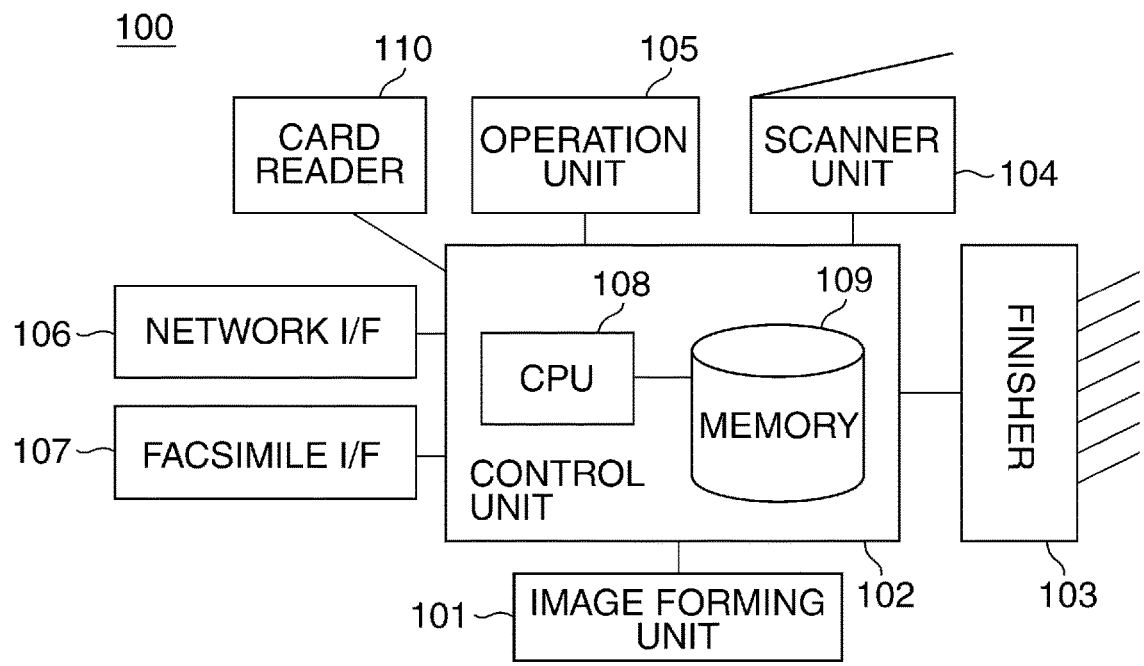
FIG. 1 is a block diagram schematically showing a configuration of an image processing apparatus according to a first embodiment of the present invention.

FIG. 1 is a block diagram schematically showing a configuration of an image processing apparatus according to a first embodiment of the present invention.

As shown in FIG. 1, the image processing apparatus 100 is provided with an image forming unit 101 that forms an image on a recording sheet with an electrophotography system, and a control unit 102 that controls the image processing apparatus 100. The image processing apparatus 100 is provided with a finisher 103 that performs post-processes such as a staple process, a scanner unit 104 that reads an original image, and an operation unit 105 through which various kinds of data and commands are inputted.

The image processing apparatus 100 is further provided with a network interface 106 that transmits and receives image data through a network, a facsimile interface 107 that transmits and receives facsimile data, and a card reader 110 that authenticates a user who uses the apparatus.

Then, the image forming unit 101, the finisher 103, the scanner unit 104, the operation unit 105, the network interface 106, and the facsimile interface 107 are connected to the control unit 102 each with a dedicated interface.

The main part of the control unit 102 consists of a CPU (central processing unit) 108 and a memory (storage means) 109.

The memory 109 stores control programs that enable methods corresponding to methods shown in the flowcharts shown in FIG. 9, FIG. 11, FIG. 13, and FIG. 14, control programs for displaying setting dialog boxes shown in FIGS. 4 through 7, FIG. 10, and FIG. 12, contents that describe operation screen information, etc.

Figure 2:
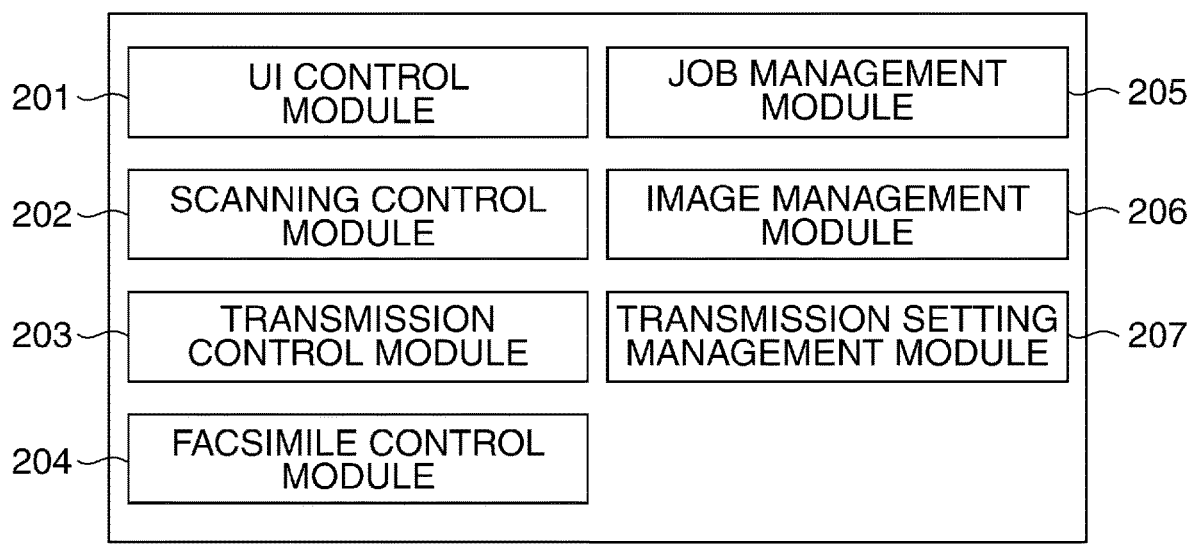
FIG. 2 is a block diagram schematically showing a software configuration of the image processing apparatus shown in FIG. 1.

FIG. 2 is a block diagram schematically showing a software configuration of the image processing apparatus 100 shown in FIG. 1.

A UI (user interface) control module 201 shown in FIG. 2 displays an operation screen on a touch panel of the operation unit 105, and controls a user interface through which user's operations are received. A scanning control module 202 controls the scanner unit 104, and controls a process for reading an original image.

A transmission control module 203 controls a process for transmitting the image data read by the scanning control module 202 to a destination designated by a user using the network interface 106. A facsimile control module 204 controls transmission and reception of a facsimile using the facsimile interface 107.

A job management module 205 manages a user's transmission request that is accepted by the UI control module 201 and its running state. An image management module 206 manages management information about the image read by the scanner unit 104. A transmission setting management module 207 manages the transmission setting that is saved in the apparatus or is read from the apparatus according to a user's instruction.

Figure 3:
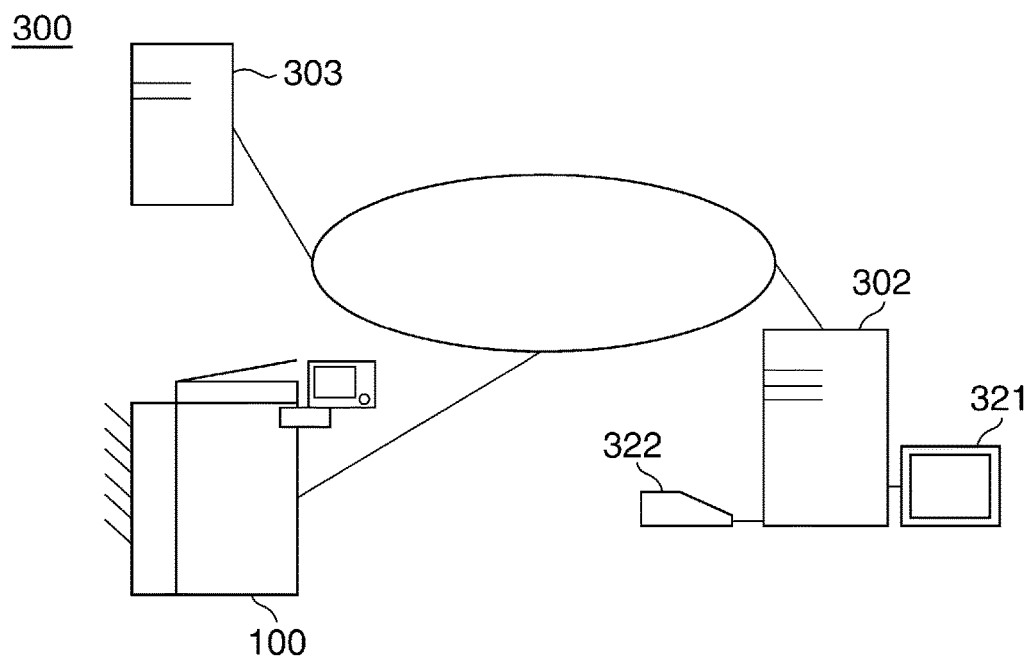
FIG. 3 is a view showing an image processing system to which the embodiment is applied.

FIG. 3 is a view showing an image processing system 300 to which the embodiment is applied.

The above-mentioned image processing apparatus 100, a server computer 302, and an authentication server 303 are shown in FIG. 3.

The server computer 302 corresponds to another apparatus that transmits image data obtained by scanning an original. A display unit 321 and an input device 322 are connected to the server computer 302.

The authentication server 303 authenticates a user when the user uses the image processing apparatus 100 and the server computer 302. These are connected to the network via respective network interfaces.

Figure 4:
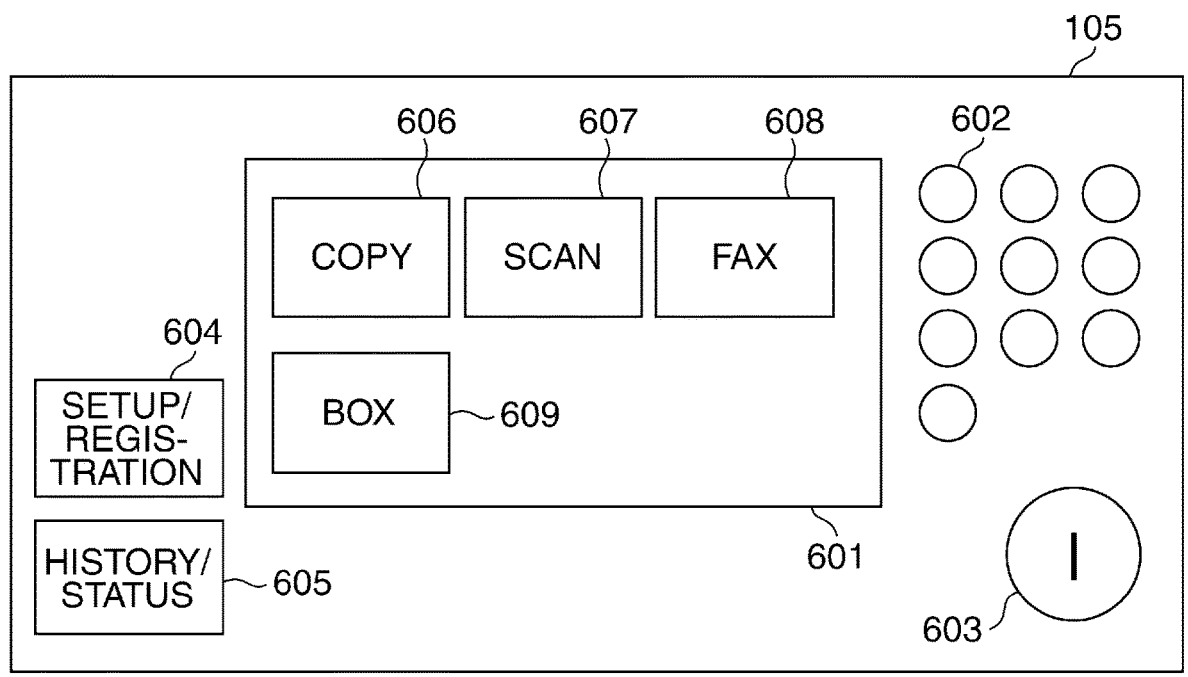
FIG. 4 is a plan view showing an operation unit shown in FIG. 1.

FIG. 4 is a plan view showing the operation unit 105 shown in FIG. 1.

In the example shown in FIG. 4, application selection buttons that call operation screens for desired functions are displayed on the touch panel 601 of the operation unit 105. In this example, a "COPY" button 606, a "SCAN" button 607, a "FAX" button 608, and a "BOX" button 609 that call operation screens for a copy function, a network scan function, a facsimile function, and a box function, respectively, are displayed.

A ten-key pad 602, a start key 603 that directs to start a job, a "SETUP/REGISTRATION" screen call button 604 that calls a device setup screen, and a "HISTORY/STATUS" button 605 that calls a job history/status screen are arranged on the operation unit 105.

Figure 5:
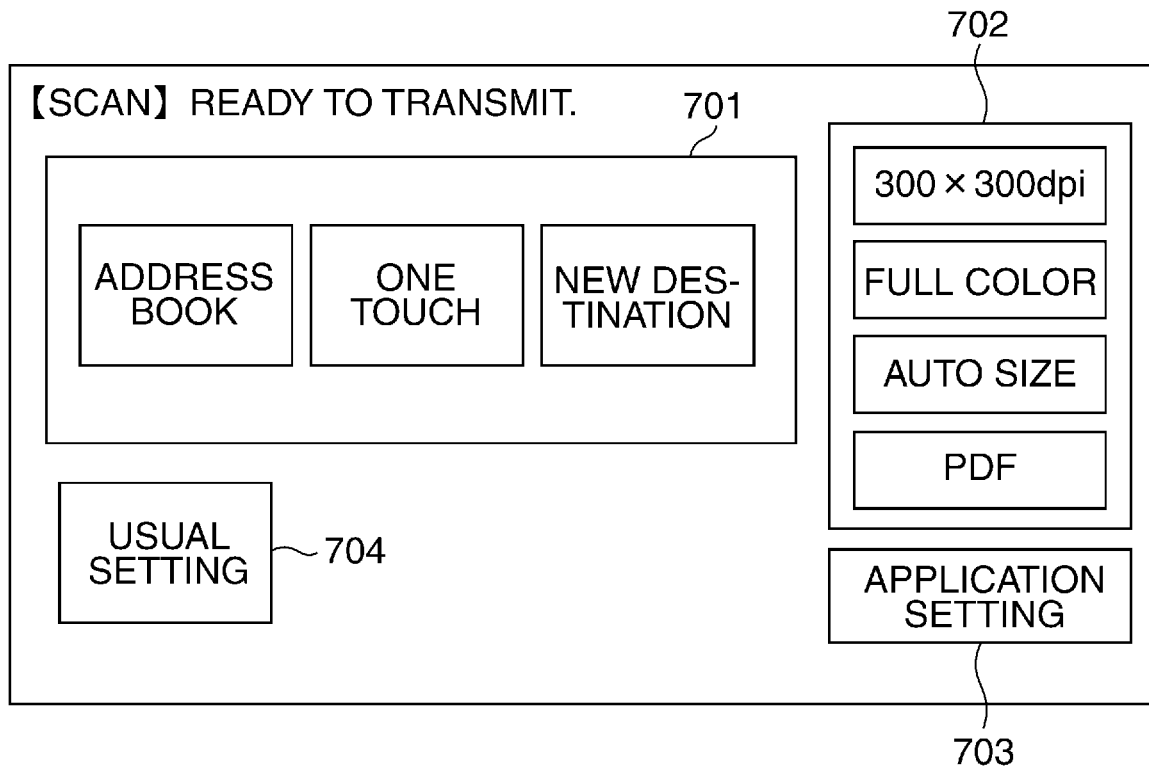
FIG. 5 is a view showing an example of a first scan operation screen displayed on a touch panel of the operation unit shown in FIG. 4.

FIG. 5 is a view showing an example of a first scan operation screen displayed on the touch panel 601 of the operation unit 105 shown in FIG. 4.

The first scan operation screen in FIG. 5 is displayed on the touch panel 601 of the operation unit 105 when a user depresses the "scan" button 607 shown in FIG. 4. In this view, a destination-input-button group 701 that allows the designation of a transmission destination is displayed.

A destination can be inputted by any methods of an "address book", a "one-touch", and a "new destination". A transmission-setting-button group 702 is used when setting up transmission settings, such as a reading resolution and a reading color mode. An application setting button 703 is used when calling various detailed settings about reading and transmitting.

A "usual setting" button 704 that calls saved transmission settings is also displayed.

The first scan operation screen enables an e-mail transmission and a file transmission. A specified setting enables a facsimile transmission.

Figure 6:
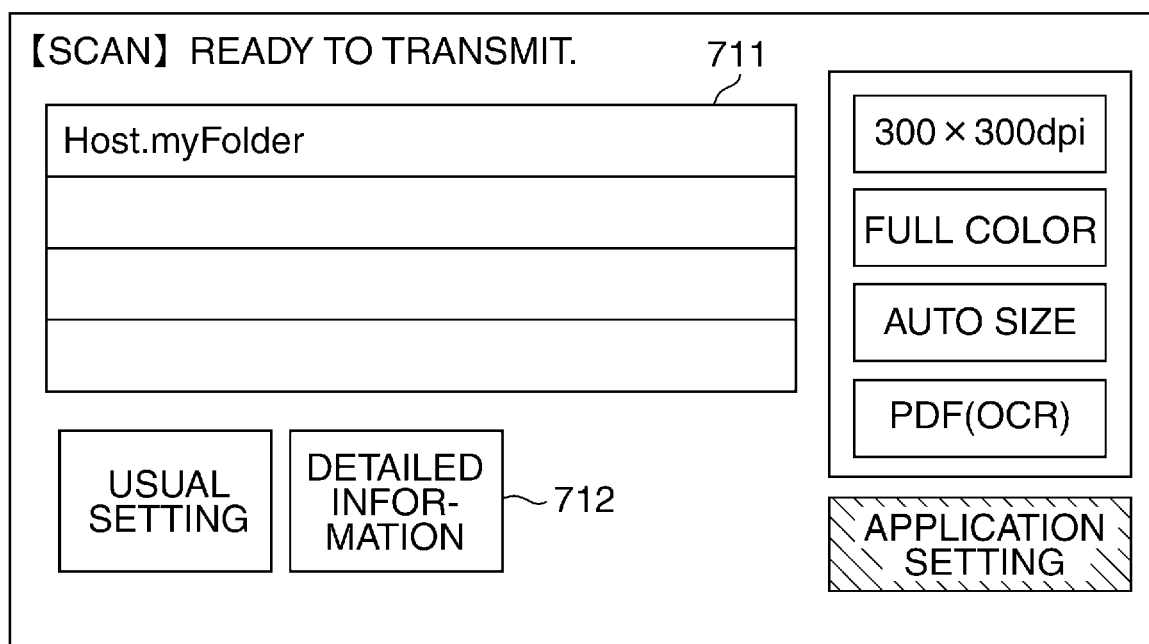
FIG. 6 is a view showing an example of a second scan operation screen displayed on the touch panel of the operation unit shown in FIG. 4.

FIG. 6 is a view showing an example of a second scan operation screen displayed on the touch panel 601 of the operation unit 105 shown in FIG. 4.

The second scanning operation screen in FIG. 6 is displayed when a user performs a transmission setting, for example, when a user designates a transmission destination.

In the example shown in FIG. 6, the transmission destination "Host.myFolder" designated by the user is displayed in a transmission destination list 711. A detailed information button 712 for displaying details of a transmission destination is also displayed. A set value is reflected to the transmission setting button and a caption of a file type button is PDF (OCR) (Portable Document Format (Adobe Acrobat) (Optical Character Recognition)). The application setting button 703 is highlighted in order to show that application settings, such as a transmitting file name, are effective.

Figures 7, 8:
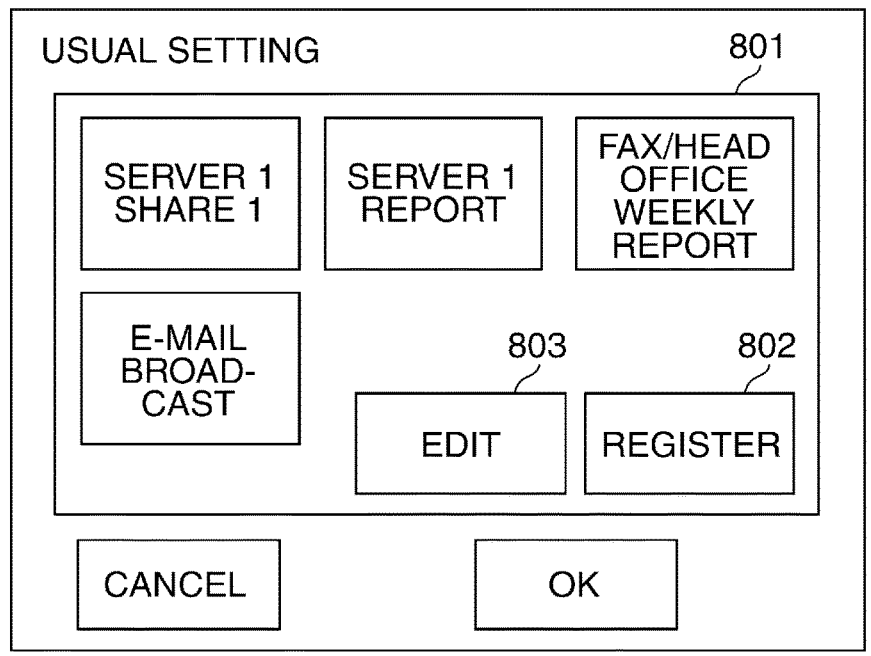
FIG. 7 is a view showing an example of a usual setting screen displayed on the touch panel of the operation unit shown in FIG. 4.
FIG. 8 is a view showing an example of usual setting information that is stored in a history on a memory shown in FIG. 1.

FIG. 7 is a view showing an example of the usual setting screen displayed on the touch panel 601 of the operation unit 105 shown in FIG. 4.

The usual setting screen is displayed on the touch panel 601 of the operation unit 105 when a user depresses the "usual setting" button 704 in FIG. 4.

As shown in FIG. 7, a "usual setting" button group 801 that is registered by the user, a registration button 802 that newly registers the current transmission setting, and an edit button 803 that edits the existing buttons are displayed on the usual setting screen. It should be noted that the "usual setting" button group 801 of the example in FIG. 7 includes buttons for "SERVER 1/SHARE 1", "SERVER 1/REPORT", "FAX/HEAD OFFICE WEEKLY REPORT", and "E-MAIL/BROADCAST".

When a user depresses a desired button included in the "usual setting" button group 801, the setting information that is related to the button is called and is reflected to the transmission setting. When the user depresses the registration button 802, the transmission setting can be registered.

FIG. 8 is a view showing an example of usual setting information (transmission setting information) that is stored in a history on the memory 109 shown in FIG. 1.

The usual setting information comprises destination information 811, reading setting information 812, file format information 813, and additional information 814.

The destination information 811 corresponds to a transmission protocol. In this example, the protocol is a "FILE" and the destination information 811 is required for the file transmission. The destination information 811 contains a password as authentication information that is used for authentication in another apparatus.

The reading setting information 812 shows size and resolution. In FIG. 8, the reading size is "AUTO" and the reading resolution is 300*300 dpi (dots per inch).

The file format information 813 shows a format of a file. FIG. 8 shows the format that uses high compression PDF and OCR. The additional information 814 is information other than the above-mentioned information, and is a transmitting file name in FIG. 8.

Figure 9:
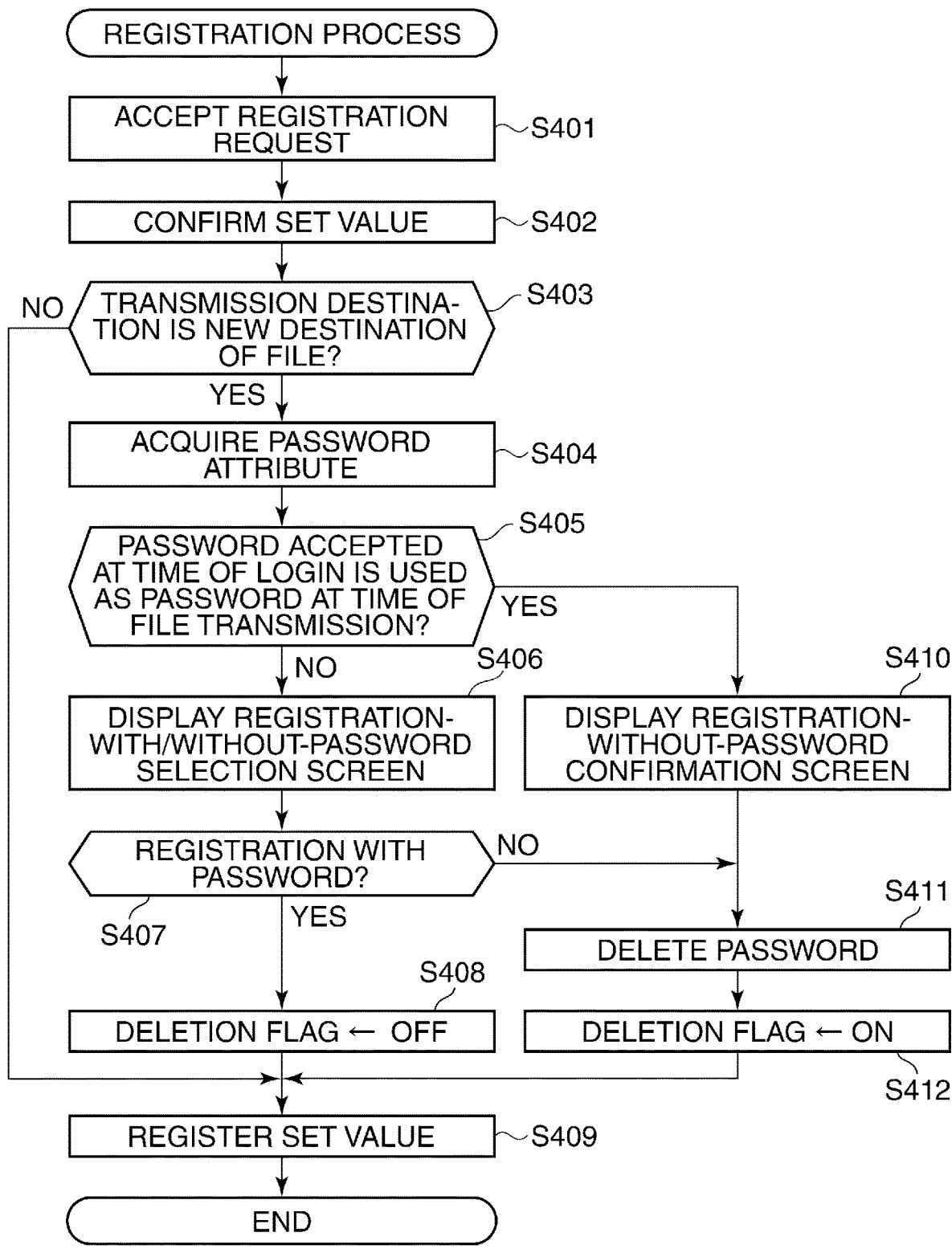
FIG. 9 is a flowchart showing a registration process executed by a CPU shown in FIG. 1.

FIG. 9 is a flowchart showing a registration process executed by the CPU 108 shown in FIG. 1.

FIG. 9 shows the process for registering the current transmission setting as a usual setting, and the program therefor is stored in the memory 109.

The UI control module 201 accepts a registration request by a user (step S401). Specifically, the user performs a desired transmission setting by operating buttons in the destination-input-button group 701 and transmission-setting-button group 702 on the scan operation screen, and opens the usual setting screen by depressing the "usual setting" button 704, and then, the user can request to save the setting by depressing the registration button 802.

Next, the UI control module 201 confirms the set value of the transmission setting corresponding to the registration request (step S402). Then, the UI control module 201 determines whether the transmission destination included in the transmission setting in the confirmed set value is a new destination of a file transmission (step S403).

Since the password is not included in the transmission setting when the transmission destination is not a new destination (NO in the step S403), the UI control module 201 leaves the process to the transmission setting management module 207, registers the set value as-is (step S409), and finishes the process.

The UI control module 201 specifically passes the registration request of the transmission setting accepted in the step S401 to the transmission setting management module 207. Then, the transmission setting management module 207 saves the set value in a predetermined area of the memory 109.

On the other hand, when the transmission destination is a new destination (YES in the step S403), the password included in the transmission setting may not be permanent. Then, the UI control module 201 acquires attribute information about the password included in the transmission setting accepted in the step S401 (step S404), and determines whether the password accepted when the user logged in to the image processing apparatus 100 is used as a password that is required at the time of file transmission (step S405).

Namely, it is determined whether a login information connection in which the password that is required at the time of file transmission is identical to the password used for the authentication at the time of login to the image processing apparatus 100 is set. The memory 109 stores the password that was used for the authentication when the user logged in to the image processing apparatus 100.

When it is set that the image processing apparatus 100 accepts a password from a user when transmitting a file, the determination result in the step S405 becomes YES.

When the determination result in the step S405 is NO, the registration-with/without-password selection screen is displayed (step S406) in order to make the user determine whether to register this as the usual setting. That is, the authentication information required at the time of file transmission can be registered in addition to the transmission destination of the file. The details of the registration-with/without-password selection screen will be described later.

Next, it is determined whether the user selected the registration with a password (step S407). When the registration of the password is selected (YES in the step S407), the UI control module 201 registers the password, sets a password deletion flag that is registered as the usual setting to OFF (step S408), and proceeds with the process to the step S409.

On the other hand, when the registration of the password is not selected (NO in the step S407), the UI control module 201 deletes the password included in the transmission setting accepted in the step S401 (step S411).

Then, the UI control module 201 sets the password deletion flag that is registered as the usual setting to ON (step S412), and proceeds with the process to the step S409.

When the determination result in the step S405 is YES, it is not preferable to register the password as the usual setting, because the password is valid only when the user is logging in to the image processing apparatus 100 and is not permanent.

Then, the UI control module 201 displays the registration-without-password confirmation screen (step S410) in order to prohibit the registration of the authentication information with the transmission destination of the file, and proceeds with the process to the step S411. The details of the registration-without-password confirmation screen will be described later.

Thus, when the password is included in the transmission setting registered as the usual setting, the registration process can be performed appropriately depending on the setting of whether the password accepted at the time of login is used as a password when transmitting a file.

Figure 10A:
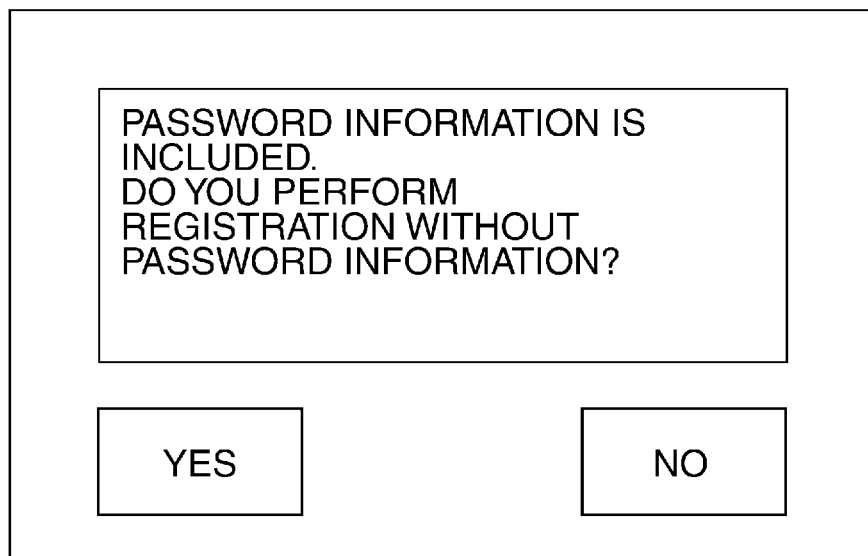
FIG. 10A is a view showing an example of a registration-with/without-password selection screen displayed on the touch panel of the operation unit shown in FIG. 4.
Figure 10B:
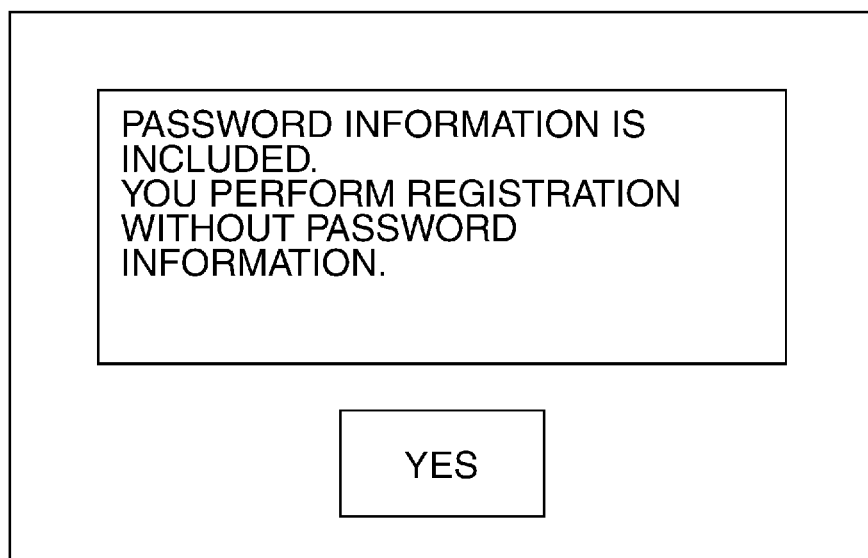
FIG. 10B is a view showing an example of a registration-without-password confirmation screen displayed on the touch panel of the operation unit shown in FIG. 4.

FIG. 10A shows an example of the registration-with/without-password selection screen, and FIG. 10B shows an example of the registration-without-password confirmation screen.

As shown in FIG. 10A, a message of "PASSWORD INFORMATION IS INCLUDED. DO YOU PERFORM REGISTRATION WITHOUT PASSWORD INFORMATION?" is displayed, and buttons of "YES" and "NO" are also displayed to make a user determine whether to register the password as the usual setting.

As shown in FIG. 10B, a massage of "PASSWORD INFORMATION IS INCLUDED. YOU PERFORM REGISTRATION WITHOUT PASSWORD INFORMATION." is displayed, and a button of "yes" is also displayed to make a user confirm the deletion of password. It should be noted that the registration-with/without-password selection screen and the registration-without-password confirmation screen may be displayed as pop-up screens.

Figure 11:
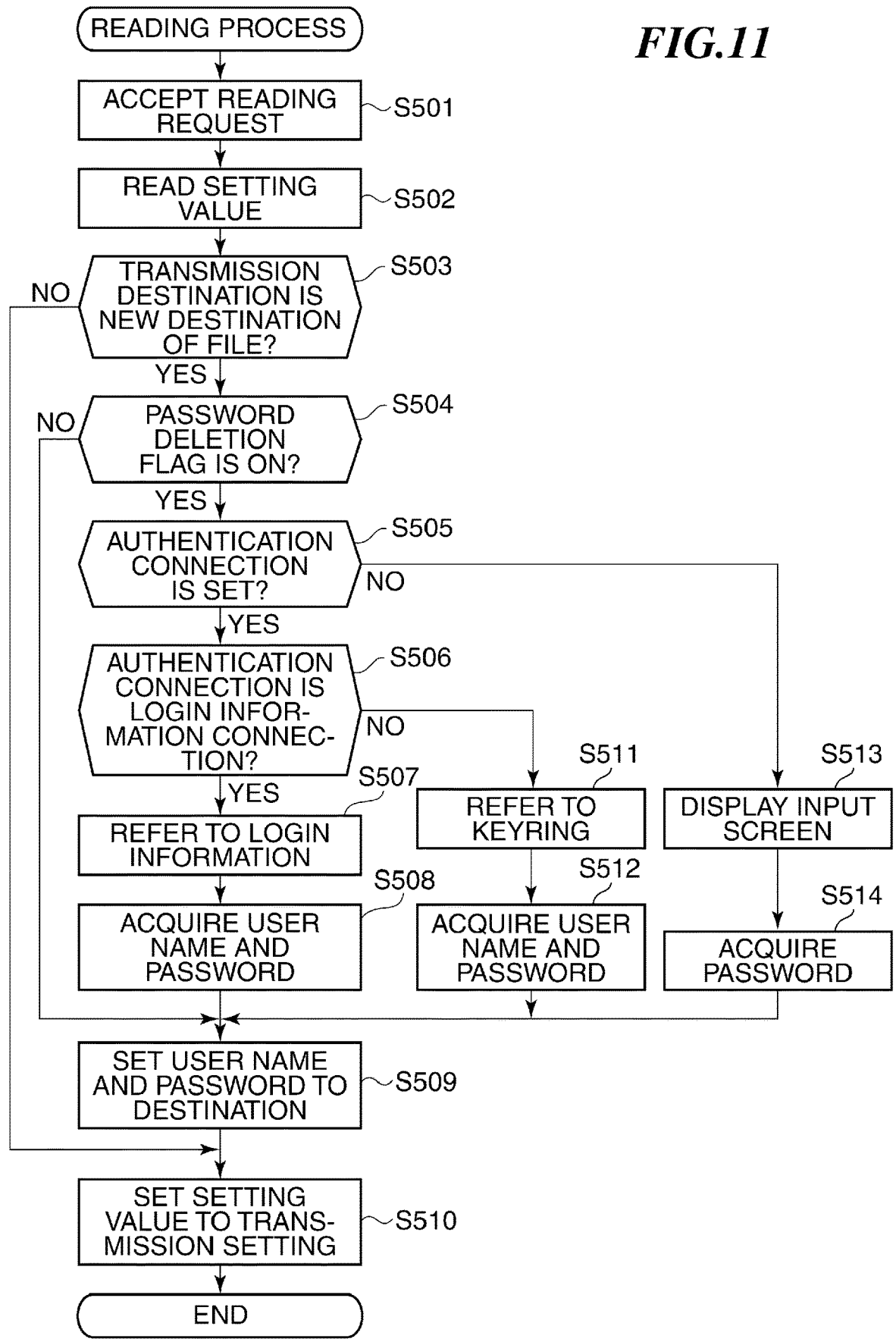
FIG. 11 is a flowchart showing a reading process executed by the CPU shown in FIG. 1.

FIG. 11 is a flowchart showing a reading process executed by the CPU 108 shown in FIG. 1.

FIG. 11 shows the process for reading a set value registered as the usual setting, and the program therefor is stored in the memory 109.

The UI control module 201 accepts a reading request by a user (step S501). Specifically, the user can request reading by depressing a desired button in the "usual setting" button group 801 that is displayed on the usual setting screen.

Next, the UI control module 201 passes the accepted reading request to the transmission setting management module 207. The transmission setting management module 207 reads the transmission setting related to the accepted usual setting from the predetermined area of the memory 109 (step S502).

Then, the UI control module 201 determines whether the transmission destination included in the read transmission setting is a new destination of a file transmission (step S503).

When the transmission destination is not a new destination (NO in the step S503), the transmission destination may be read as-is because it does not include a password. Then, the UI control module 201 sets the transmission setting read in the step S502 as the current transmission setting (step S510), and finishes the process.

On the other hand, when the transmission destination is a new destination (YES in the step S503), the UI control module 201 checks the password deletion flag included in the set value read in the step S502, and determines whether the flag is ON (step S504).

When the flag is not ON (NO in the step S504), the password was not deleted.

Then, the UI control module 201 sets the user name and password that are included in the set value read in the step S502 as the user name and password of the transmission destination (step S509), and proceeds with the process to the step S510.

On the other hand, when the flag is ON (YES in the step S504), the password was deleted. Then, the UI control module 201 refers to the settings of the apparatus and determines whether an authentication connection is set (step S505).

When the authentication connection is set (YES in the step S505), the authentication information related to the user who is specified using the user authentication function can be used as the authentication information at the time of transmission.

Then, the UI control module 201 determines whether the authentication connection setting is a login information connection (step S506). When the authentication connection setting is a login information connection (YES in the step S506), the authentication information used when the user used the apparatus earlier can be used at the time of transmission.

Then, the UI control module 201 refers to the login information that is the authentication information used when the user used the apparatus using the card reader 110 (step S507), acquires the user name and password (step S508), and proceeds with the process to the step S509.

On the other hand, when the authentication connection setting is not the login information connection (NO in the step S506), the authentication information related to the user uses information that the user registered to a keyring. A keyring is a bundle of encryption keys that are used in message authentication code, for example.

Then, the UI control module 201 refers to the authentication information related to the user who is specified by the user authentication function by referring to the keyring (step S511), acquires a user name and a password (step S512), and proceeds with the process to the step S509. That is, when the authentication information is not registered at the time of transmitting data to another apparatus again, the UI control module 201 reflects the authentication information registered into the keyring related to the user who operates the image processing apparatus 100 to the transmission setting information.

When the authentication connection is not set (NO in the step S505), the UI control module 201 displays a destination input screen in order to prompt a user to input (step S513).

The destination input screen will be described below.

Next, the UI control module 201 acquires the password that the user inputted into a password input field 1004 (step S514), and proceeds with the process to the step S509.

Although the above description deals with the password included in a file destination, the process shown in FIG. 11 is applicable to other passwords included in the transmission setting in addition to the password included in the file destination. For example, a format in which a file-operating permission acquired from a file-operating-permission-management server is added to the file may be designated as the transmission file format. At the time, the transmission setting that is registered or is read may include a password for accessing the file-operating-permission-management server.

In this case, the UI control module 201 determines whether the transmission setting includes a password for accessing the file-operating-permission-management server in the step S403. In the step S503, the UI control module 201 determines whether the file format included in the read transmission setting handles the file operating permission.

In the process in FIG. 9, the UI control module 201 determines whether the authentication information required by another apparatus at the time of a file transmission is permanent information that can be used when transmitting data to another apparatus again (the step S405). Then, when the authentication information is permanent, it is registered (the step S408). Next, as shown in FIG. 11, when the authentication information is registered at the time of transmitting data to another apparatus again, the UI control module 201 reflects the authentication information concerned to the transmission setting information (step S509). As a result, the operability for inputting the authentication information that is used to transmit data to another apparatus is improved.

Figure 12:
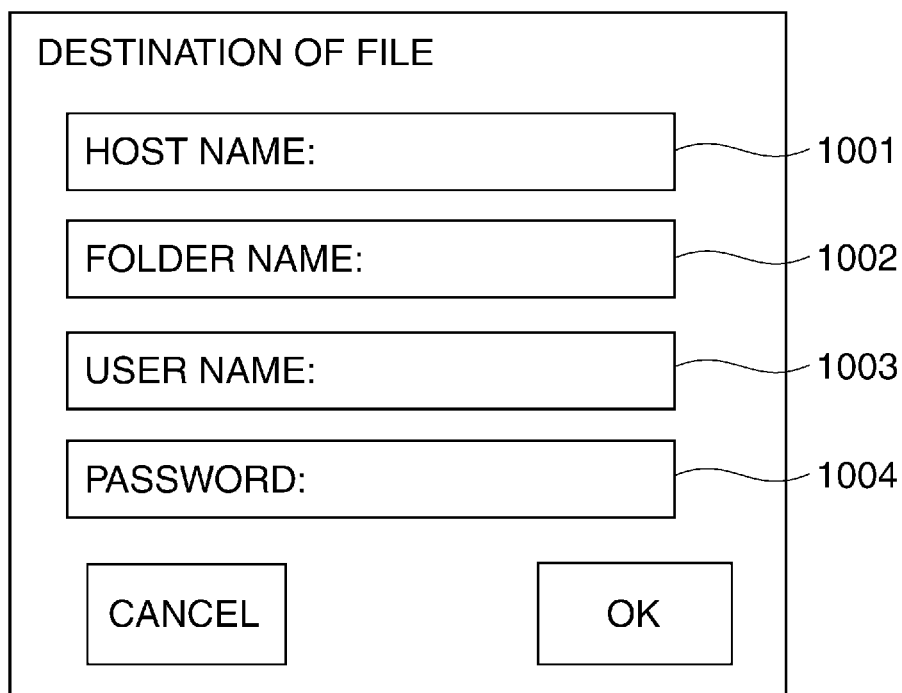
FIG. 12 is a view showing an example of a destination input screen displayed on the touch panel of the operation unit in FIG. 4.

FIG. 12 is a view showing an example of the file-destination input screen that the UI control module 201 displays on the touch panel 601 of the operation unit 105. In the screen, a host name input field 1001, a folder name input field 1002, a user name input field 1003, and a password input field 1004 are displayed. Then, a user inputs data into these fields.

Next, a second embodiment of the present invention will be described. The configuration of the image forming apparatus in the second embodiment is similar to the configuration of the image forming apparatus 100 in the first embodiment, and its description is omitted.

The first embodiment determines whether the password is permanent or not by referring to the attribute information of the password for the file transmission to a new destination. On the other hand, when a destination of file transmission is registered in an address book, a user may designate to input a password each time on the assumption that a password is frequently changed.

In this case, when the user designates a transmission destination that requires to input a password each time, an input of a password is required whenever transmitting a file.

When the transmission destination that is registered as the usual setting requires inputting a password each time, the password is not permanent.

Figure 13:
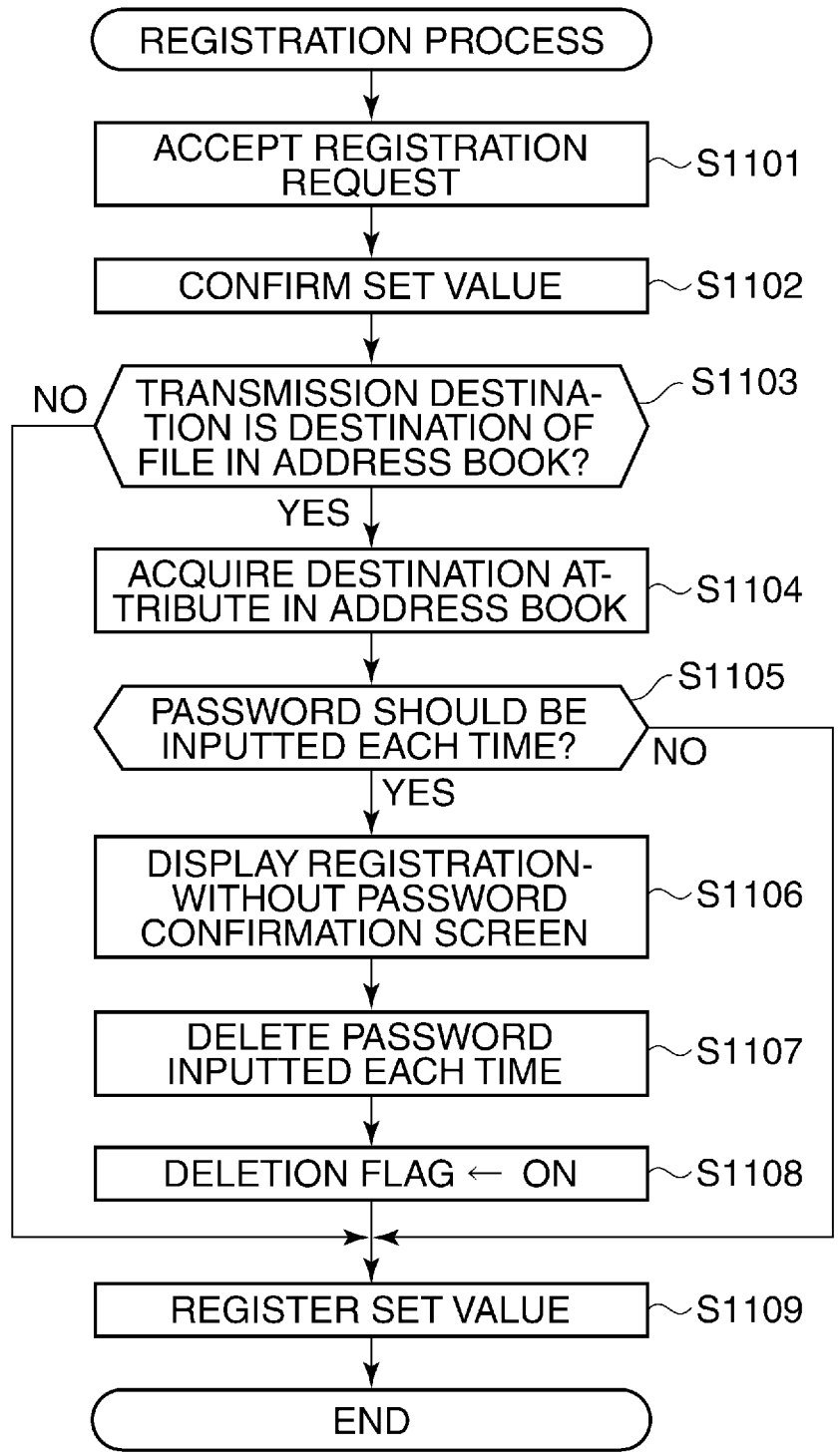
FIG. 13 is a flowchart showing a registration process according to a second embodiment.

FIG. 13 is a flowchart showing a registration process according to the second embodiment.

FIG. 13 shows the process for registering the current transmission setting as a usual setting, and the program therefor is stored in the memory 109 and is executed by the CPU 108.

The UI control module 201 accepts a registration request that a user designates to register a transmission setting as a usual setting (step S1101), and confirms the set value of the transmission setting corresponding to the accepted registration request (step S1102).

Then, the UI control module 201 determines whether the transmission destination included in the transmission setting in the confirmed set value is a destination of a file transmission in an address book (step S1103).

When the transmission destination is not a destination in the address book (NO in the step S1103), the UI control module 201 passes the transmission setting corresponding to the accepted saving request to the transmission setting management module 207 because such a setting is permitted to register as-is.

Then, the transmission setting management module 207 registers the set value into a predetermined area of the memory 109 (step S1109), and finishes the process.

On the other hand, when the transmission destination is a destination in the address book (YES in the step S1103), the password may be required to input each time, and the password may not be permanent.

Then, the UI control module 201 acquires the attribute of the destination in the address book of the transmission destination included in the transmission setting corresponding to the accepted registration request (step S1104), and determines whether the password should be inputted each time (step S1105).

When the password is not required to input each time (NO in the step S1105), the password is permanent, and the process proceeds to the step S1109.

On the other hand, when the password is required to input each time (YES in the step S1105), the password is not permanent, and it is not preferred to register it as the usual setting.

Accordingly, the UI control module 201 displays the registration-without-password confirmation screen shown in the FIG. 10B, and notifies the user of deleting the password (step S1106). Next, the UI control module 201 deletes the password inputted each time that is included in the transmission setting corresponding to the accepted registration request (step S1107), sets the password deletion flag saved as the usual setting to ON (step S1108), and proceeds with the process to the step S1109.

The reading process in the second embodiment is identical to the reading process shown in FIG. 11 except the process in the step S503. In the second embodiment, the UI control module 201 determines the transmission destination included in the read transmission setting is a destination of a file transmission in the address book in the step S503.

Next, a third embodiment of the present invention will be described. The configuration of the image forming apparatus in the third embodiment is similar to the configuration of the image forming apparatus 100 in the first embodiment, and its description is omitted.

In the first and second embodiments, when calling the usual setting including the file transmission destination, the user name and the password at the time of calling are set instead of that at the time of registration.

It is conceivable to set the host name and the folder name of the transmission destination at the time of calling in addition to the user name and the password.

For example, a setting of an apparatus can restrict the destination of the file transmission to a specific folder related to an individual user from the point of view of security. In this case, it is conceivable that the host name and the folder name of the transmission destination that are related to the user are effective only when the user is logged in, and are not permanent.

Figure 14:
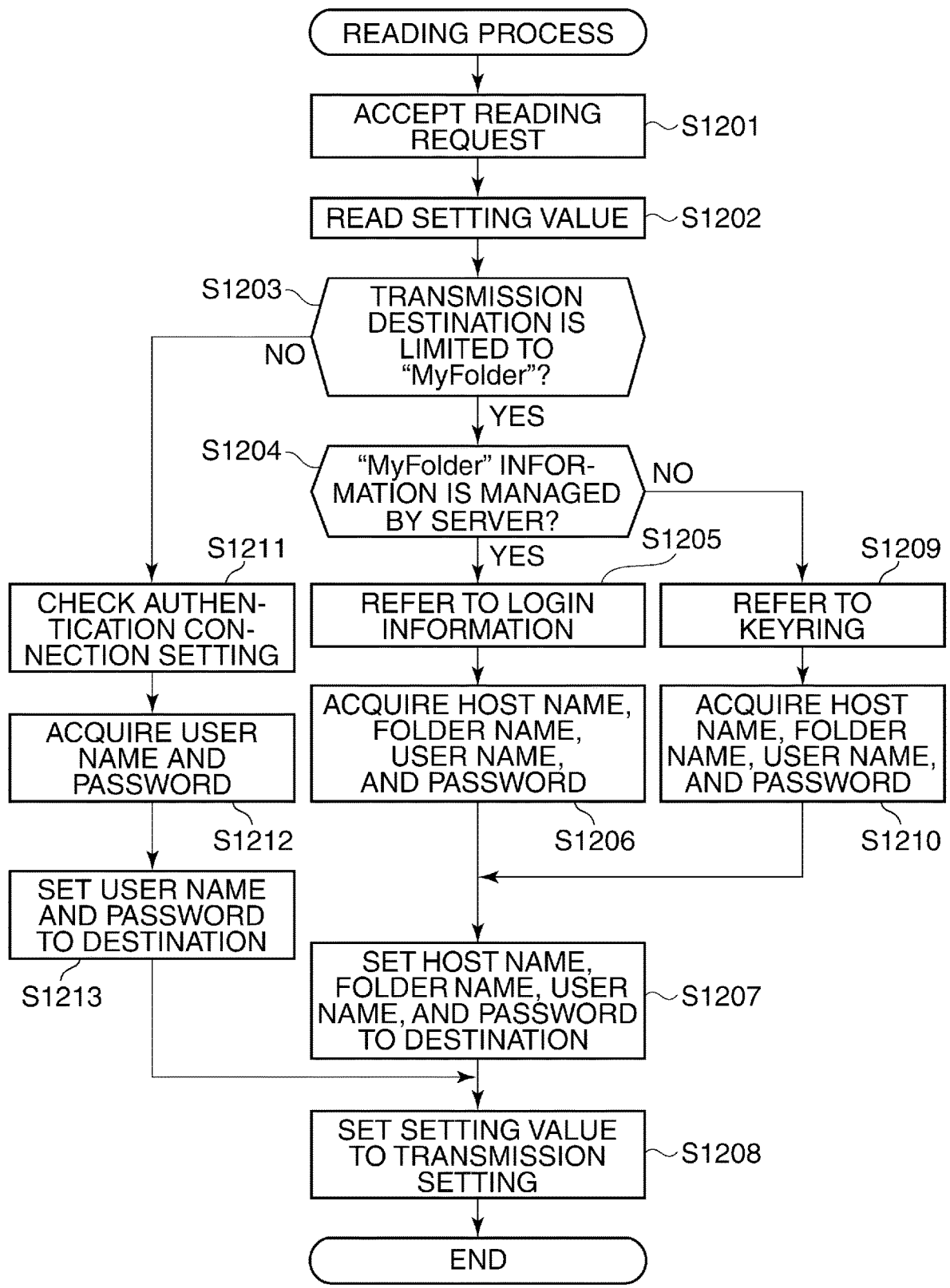
FIG. 14 is a flowchart showing a reading process according to a third embodiment.

FIG. 14 is a flowchart showing a reading process according to the third embodiment.

FIG. 14 shows the process for registering the current transmission setting as a usual setting, and the program therefor is stored in the memory 109 and is executed by the CPU 108.

The UI control module 201 accepts a reading request by a user (step S1201). Specifically, the user can request reading by pressing a desired button in the "usual setting" button group 801 that is displayed on the usual setting screen.

Next, the UI control module 201 passes the accepted reading request to the transmission setting management module 207. The transmission setting management module 207 reads the transmission setting related to the accepted usual setting from the predetermined area of the memory 109 (step S1202).

Next, the UI control module 201 determines whether a file transmission destination is limited to a "MyFolder" related to the user with reference to the setting of the apparatus (step S1203).

When the transmission destination is not limited to the "MyFolder" (NO in the step S1203), the UI control module 201 refers to the setting of the apparatus. Then, the UI control module 201 checks an authentication connection setting (step S1211), and acquires a user name and a password (step S1212).

Next, the UI control module 201 sets the acquired user name and password to the transmission destination (S1213), sets them together with the other transmission settings read in the step S1202 as the current transmission setting (step S1208), and finishes the process.

The process in the steps S1211 through S1213 corresponds to the process in the steps S505 through S509 in the flowchart in FIG. 11.

When the transmission destination is limited to the "MyFolder" (YES in the step S1203), the UI control module 201 refers to the setting of the apparatus. Then, the UI control module 201 determines whether the "MyFolder" information related to the user is managed by the authentication server (step S1204).

When the "MyFolder" information is managed by the authentication server (YES in the step S1204), the UI control module 201 refers to the login information acquired at the time of the authentication for operating the apparatus by the user (step S1205).

Then, the UI control module 201 acquires a host name, a folder name, a user name, and a password that are related to the user and are managed by the authentication server (step S1206).

Next, the UI control module 201 sets the host name, the folder name, the user name, and the password that are acquired in the step S1206 to the transmission destination (step S1207), and proceeds with the process to the step S1208.

When the "MyFolder" information is not managed by the authentication server (NO in the step S1204), the UI control module 201 refers to the keyring (step S1209). Then, the UI control module 201 acquires a host name, a folder name, a user name, and a password that are related to the registered user (step S1210), and proceeds with the process to the step S1207.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-255056, filed on Nov. 22, 2011, which is hereby incorporated by reference herein in its entirety.

What is claimed is:

1. A data communication apparatus that performs a file transmission, the data communication apparatus comprising:
    an operation device;
    one or more memories that store a set of instructions; and
    one or more processors that execute the instructions causing the data communication apparatus to:
    receive a transmission destination for the file transmission;
    set authentication information required for the file transmission using the received transmission destination; and
    register the transmission destination without the set authentication information according to a registration setting, wherein the registered transmission destination is information received in accordance with the transmission destination for the file transmission having been set by a user via the operation device.

2. The data communication apparatus according to claim 1, further comprising a scanner for scanning an original image,
    wherein the instructions further cause the data communication apparatus to transmit a file corresponding to the original image scanned by the scanner to the registered transmission destination.

3. The data communication apparatus according to claim 2, wherein the instructions further cause the data communication apparatus to obtain, in a case where the transmission destination registered without the set authentication information is used for another file transmission, authentication information for the another file transmission.

4. The data communication apparatus according to claim 1, wherein the transmission destination includes at least one of host name information and folder information.

5. The data communication apparatus according to claim 1, wherein the set authentication information is used for authentication in a file server corresponding to the transmission destination.

6. The data communication apparatus according to claim 1, wherein the set authentication information is a password.

7. The data communication apparatus according to claim 1, wherein the set authentication information is input for login to the data communication apparatus and is further used for authentication in a file server corresponding to the transmission destination.

8. The data communication apparatus according to claim 1, wherein the instructions further cause the data communication apparatus to:
  receive, as the registration setting, a user's specification as to whether to register the received transmission destination, including or excluding the set authentication information; and
  wherein, in a case where the user's specification as the registration setting indicates that the received transmission destination excluding the set authentication information is to be registered, the received transmission destination is registered without the set authentication information.

9. The data communication apparatus according to claim 7, wherein in a case where the user's specification as the registration setting indicates that the received transmission destination including the set authentication information is to be registered, the received transmission destination and the set authentication information is registered.

10. The data communication apparatus according to claim 8, wherein the instructions further cause the data communication apparatus to perform a confirmation related to a registration of the received transmission destination and the set authentication information, and
  wherein, in a case where the user's specification received as a result of the confirmation indicates that the received transmission destination excluding the set authentication information is to be registered, the received transmission destination is registered without the set authentication information.

11. A method for controlling a data communication apparatus that includes an operation device and that performs a file transmission, the method comprising:
  receiving the transmission destination for a file transmission;
  setting authentication information required for the file transmission using the received transmission destination; and
  registering the transmission destination without the set authentication information according to a registration setting, wherein the registered transmission destination is information received in accordance with the transmission destination for the file transmission having been set by a user via the operation device.

12. The method according to claim 11, wherein the data communication apparatus comprises a scanner for scanning an original image, and
  wherein a file corresponding to the original image scanned by the scanner is transmitted to the registered transmission destination.

13. The method according to claim 12, further comprising obtaining, in a case where the transmission destination registered without the set authentication information is used for another file transmission, authentication information for the another file transmission.

14. The method according to claim 11, wherein the transmission destination includes at least one of host name information and folder information.

15. The method according to claim 11, wherein the set authentication information is used for authentication in a file server corresponding to the transmission destination.

16. The method according to claim 11, wherein the set authentication information is a password.

17. The method according to claim 11, wherein the set authentication information is input for login to the data communication apparatus and is further used for authentication in a file server corresponding to the transmission destination.

18. The method according to claim 11, further comprising receiving, as the registration setting, a user's specification as to whether to register the received transmission destination, including or excluding the set authentication information; and
  wherein, in a case where the user's specification as the registration setting indicates that the received transmission destination excluding the set authentication information is to be registered, the received transmission destination is registered without the set authentication information.

19. The method according to claim 18, wherein in a case where the user's specification as the registration setting indicates that the received transmission destination including the set authentication information is to be registered, the received transmission destination and the set authentication information is registered.

20. The method according to claim 18, further comprising performing a confirmation related to a registration of the received transmission destination and the set authentication information, and
  wherein in a case where the user's specification received as a result of the confirmation indicates that the received transmission destination excluding the set authentication information is to be registered, the received transmission destination is registered without the set authentication information.

21. A non-transitory computer-readable storage medium storing a program that, when executed by a computer, causes the computer to perform a method of controlling a data communication apparatus that includes an operation device and that performs a file transmission, the method comprising:
  receiving the transmission destination for a file transmission;
  setting authentication information required for the file transmission using the received transmission destination; and
  registering the transmission destination without the set authentication information according to a registration setting, wherein the registered transmission destination is information received in accordance with the transmission destination for the file transmission having been set by a user via the operation device.

22. An image processing apparatus comprising:
  a scanner for scanning an original image;
  one or more memories that store a set of instructions; and
  one or more processors that execute the instructions causing the image processing apparatus to:

receive a transmission destination;

set authentication information required for the file transmission using the received transmission destination;

transmit, using the received transmission destination and the set authentication information, a file corresponding to the original image scanned by the scanner;

receive a user's specification as to whether to register the received transmission destination, including or excluding the set authentication information; and register, in a case where the user's specification indicates that the received transmission destination excluding the set authentication information is to be registered, the received transmission destination without the set authentication information.

23. The image processing apparatus according to claim 22, wherein the transmission destination includes at least one of host name information and folder information.

24. The image processing apparatus according to claim 22, wherein the set authentication information is used for authentication in a file server corresponding to the transmission destination.

25. The image processing apparatus according to claim 22, wherein the set authentication information is input for login to the image processing apparatus and is further used for authentication in a file server corresponding to the transmission destination.

26. The image processing apparatus according to claim 22, wherein in a case where the user's specification indicates that the received transmission destination including the set authentication information is to be registered, the received transmission destination and the set authentication information is registered.

27. The image processing apparatus according to claim 22, wherein the instructions further cause the image processing apparatus to obtain, in a case where the transmission destination registered without the set authentication information is used for another file transmission, authentication information for the another file transmission.

28. A method for an image processing apparatus including a scanner for scanning an original image, the method comprising:

receiving a transmission destination;

setting authentication information required for the file transmission using the received transmission destination;

transmitting, using the received transmission destination and the set authentication information, a file corresponding to the original image scanned by the scanner;

receiving a user's specification as to whether to register the received transmission destination, including or excluding the set authentication information; and registering, in a case where the user's specification indicates that the received transmission destination excluding the set authentication information is to be registered, the received transmission destination without the set authentication information.

29. The method according to claim 28, wherein the transmission destination includes at least one of host name information and folder information.

30. The method according to claim 28, wherein the set authentication information is used for authentication in a file server corresponding to the transmission destination.

31. The method according to claim 28, wherein the set authentication information is input for login to the image processing apparatus and is further used for authentication in a file server corresponding to the transmission destination.

32. The method according to claim 28, wherein in a case where the user's specification indicates that the received transmission destination including the set authentication information is to be registered, the received transmission destination and the set authentication information is registered.

33. The method according to claim 28, further comprising obtaining, in a case where the transmission destination registered without the set authentication information is used for another file transmission, authentication information for the another file transmission.

* * * * *